US011681701B2

(12) United States Patent
Choi et al.

(10) Patent No.: US 11,681,701 B2
(45) Date of Patent: *Jun. 20, 2023

(54) SYSTEMS AND METHODS FOR REDUCING DATABASE QUERY LATENCY

(71) Applicant: COUPANG CORP., Seoul (KR)

(72) Inventors: Sung Ho Choi, Seoul (KR); Seong Jin Kim, Seoul (KR)

(73) Assignee: Coupang Corp., Seoul (KR)

( * ) Notice: Subject to any disclaimer, the term of this patent is extended or adjusted under 35 U.S.C. 154(b) by 30 days.

This patent is subject to a terminal disclaimer.

(21) Appl. No.: 17/455,621

(22) Filed: Nov. 18, 2021

(65) Prior Publication Data

US 2022/0075779 A1 Mar. 10, 2022

Related U.S. Application Data

(63) Continuation of application No. 16/872,947, filed on May 12, 2020, now Pat. No. 11,210,288.

(51) Int. Cl.
*G06F 7/00* (2006.01)
*G06F 16/2453* (2019.01)

(52) U.S. Cl.
CPC .. *G06F 16/24537* (2019.01); *G06F 16/24542* (2019.01)

(58) Field of Classification Search
CPC ........... G06F 16/2453; G06F 16/24537; G06F 16/24542; G06F 16/2228

(Continued)

(56) References Cited

U.S. PATENT DOCUMENTS 8,954,412 B1 2/2015 Zhao et al.
2003/0009453 A1* 1/2003 Basso ................. H04L 61/4552

(Continued)

FOREIGN PATENT DOCUMENTS

CN 103617174 A 3/2014
CN 105139592 A 12/2015

(Continued)

OTHER PUBLICATIONS

Notice of Preliminary Rejection in counterpart Korean Application No. 10-2022-0033006 dated Dec. 6, 2022 (11 pages).

(Continued)

*Primary Examiner* — Md I Uddin
(74) *Attorney, Agent, or Firm* — Finnegan, Henderson, Farabow, Garrett & Dunner LLP

(57) ABSTRACT

A system for reducing database query latency, the system comprising: a memory storing instructions; and at least one processor configured to execute the instructions to perform operations comprising: receiving data reflecting performance of a role on a virtual server; identifying tokens associated with terms in the received data; mapping an index comprising the tokens and the terms; storing the mapped index in a first database; storing a key-value pair in a second database, the key corresponding to the mapped index, and the value corresponding to a portion of the received data; receiving a query; optimizing the query to reduce query processing time; constructing a search key based on results obtained by running the optimized query against the first database; retrieving a result value from the second database corresponding to the search key.

18 Claims, 10 Drawing Sheets

(58) Field of Classification Search
USPC .................. 707/706, 715, 723, 741, 999.003
See application file for complete search history.

(56) References Cited

U.S. PATENT DOCUMENTS

| | | |
|---|---|---|
| 2003/0074352 A1 | 4/2003 | Raboczi et al. |
| 2003/0182272 A1 | 9/2003 | Leung et al. |
| 2009/0199175 A1* | 8/2009 | Keller .................. G06F 9/455 717/178 |
| 2013/0339366 A1* | 12/2013 | Khimich ............... G06F 16/215 707/741 |
| 2015/0339382 A1 | 11/2015 | Skolicki |
| 2015/0363470 A1* | 12/2015 | Bestgen ............ G06F 16/24575 707/723 |
| 2017/0132283 A1 | 5/2017 | Kornacker et al. |
| 2017/0344588 A1* | 11/2017 | Horowitz ............ G06F 16/2228 |
| 2018/0329999 A1 | 11/2018 | Kale et al. |
| 2019/0121998 A1 | 4/2019 | VanderLeest |
| 2020/0042521 A1 | 2/2020 | Isoda et al. |

FOREIGN PATENT DOCUMENTS

| | | |
|---|---|---|
| CN | 105279157 A | 1/2016 |
| KR | 1020080091171 | 10/2008 |
| KR | 1020140112427 | 9/2014 |
| KR | 1020150104585 | 9/2015 |
| KR | 1020170007799 | 1/2017 |
| KR | 1020170103021 | 9/2017 |
| KR | 10-2019-0015285 A | 2/2019 |
| KR | 102047233 | 11/2019 |
| KR | 1020190139970 | 12/2019 |
| KR | 1020200036049 | 4/2020 |
| TW | 201944232 A | 11/2019 |
| WO | WO 2019/045961 | 3/2019 |

OTHER PUBLICATIONS

C. Ordonez et al., A Survey on Parallel Database Systems from a Storage Perspective: Rows versus Columns, DEXA 2018 Communications in Computer and Information Science vol. 903, pp. 5-20, 2018 (16 pages).
V. Varga et al., Storing location-based services data in key-value store, Studia Universitatis Babes-Bolyai, Informatica vol. 56, pp. 51-62, 2011 (12 pages).
Taiwanese Office Action in counterpart Taiwanese Application No. 109145982 dated Feb. 23, 2022 (15 pages).
Decision of Patent Grant in counterpart Korean Application No. 10-2020-0084847 dated Dec. 23, 2021 (4 pages).
"Differences and cautions between UNION and UNION ALL," dated Jan. 1, 2011, http://intomysql.blogspot.com/2011/01/union-union-all.html (6 pages).
Examination Notice in counterpart Hong Kong Application No. 22021029390.02 dated Mar. 21, 2022 (6 pages).
Search Report for counterpart Korean Patent Application No. 10-2020-0084847, dated Aug. 5, 2020 (8 pages).
International Search Report and Written Opinion in counterpart Application No. PCT/IB2020/062562 dated Mar. 31, 2021 (8 pages).
Notice of Preliminary Rejection for counterpart Korean Patent Application No. 10-2020-0084847, dated May 27, 2021 (8 pages).

* cited by examiner

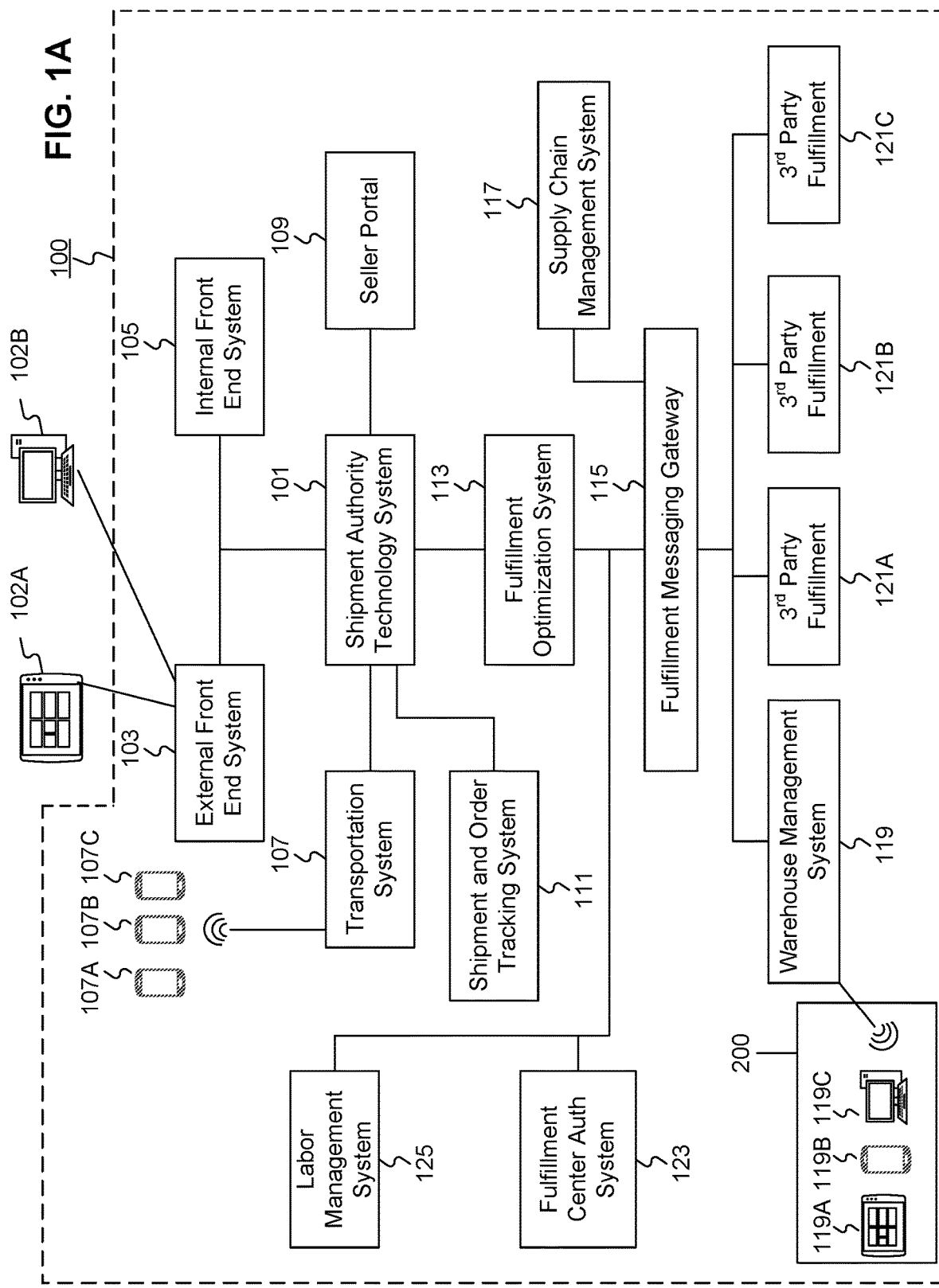

SYSTEMS AND METHODS FOR REDUCING DATABASE QUERY LATENCY

CROSS-REFERENCE TO RELATED APPLICATIONS

This application is a continuation of and claims the benefit of priority to U.S. application Ser. No. 16/872,947, filed May 12, 2020 (now allowed), the contents of which are hereby incorporated herein by reference.

TECHNICAL FIELD

The present disclosure generally relates to computerized systems and methods for reducing latency in database queries. In particular, embodiments of the present disclosure relate to inventive and unconventional systems relate to reducing latency of data retrieval from a storage database by creating a search key for the storage database based on querying an index database.

BACKGROUND

Server platforms perform important roles in enabling large scale, processing intensive applications. Online retailing businesses particularly rely on large numbers of these server platforms to carry out millions of transactions daily. Functionality and reliability of these server platforms may therefore be of particular concern, and the performance of these server platforms may need frequent monitoring. Any error or non-performance may require investigation, and improvements and modifications of these server platforms may likewise require analysis of system performance.

Server platforms may generate metric data indicating status and performance during their operation. These metric data may be recorded as logs, and may be stored for access at a later time. In situations where a large number of server platforms are performing a large number of tasks, the metric data generated may also be numerous. In some instances, in order to enhance reliability and provide redundancy, some server platform architecture may be configured to store multiple copies of this metric data across several different locations. Moreover, in order to store the large amount of the metric data in a timely manner, the metric data may not be indexed in a way that are efficient for searches and retrievals.

Therefore, due to the large amount of metric data stored, which may exist in multiple copies may not be indexed optimally for retrieval, it may be time and resource consuming to locate and retrieve the specific log containing metric data desired by a user, resulting in latency.

Therefore, there is a need for improved methods and systems for reducing database query latency.

SUMMARY

One aspect of the present disclosure is directed to a system for reducing database query latency, the system comprising: a memory storing instructions; and at least one processor configured to execute the instructions to perform operations comprising: receiving data reflecting performance of a role on a virtual server; identifying tokens associated with terms in the received data; mapping an index comprising the tokens and the terms; storing the mapped index in a first database; storing a key-value pair in a second database, the key corresponding to the mapped index, and the value corresponding to a portion of the received data; receiving a query; optimizing the query to reduce query processing time; constructing a search key based on results obtained by running the optimized query against the first database; retrieving a result value from the second database corresponding to the search key.

Another aspect of the present disclosure is directed to a method for reducing database query latency, the method comprising: receiving data reflecting performance of a role on a virtual server; identifying tokens associated with terms in the received data; mapping an index comprising the tokens and the terms; storing the mapped index in a first database; storing a key-value pair in a second database, the key corresponding to the mapped index, and the value corresponding to a portion of the received data; receiving a query; optimizing the query to reduce query processing time; constructing a search key based on results obtained by running the optimized query against the first database; retrieving a result value from the second database corresponding to the search key.

Yet another aspect of the present disclosure is directed to a computer-implemented method for reducing database query latency, the method comprising: receiving data reflecting performance of a role on a virtual server; identifying tokens associated with terms in the received data; mapping an index comprising the tokens and the terms; storing the mapped index in a first database; storing a key-value pair in a second database, the key corresponding to the mapped index, and the value corresponding to a portion of the received data; receiving a query; optimizing the query to reduce query processing time; constructing a search key based on results obtained by running the optimized query against the first database; retrieving a result value from the second database corresponding to the search key.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for reducing database query latency.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3rd party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
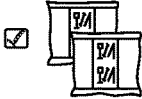
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
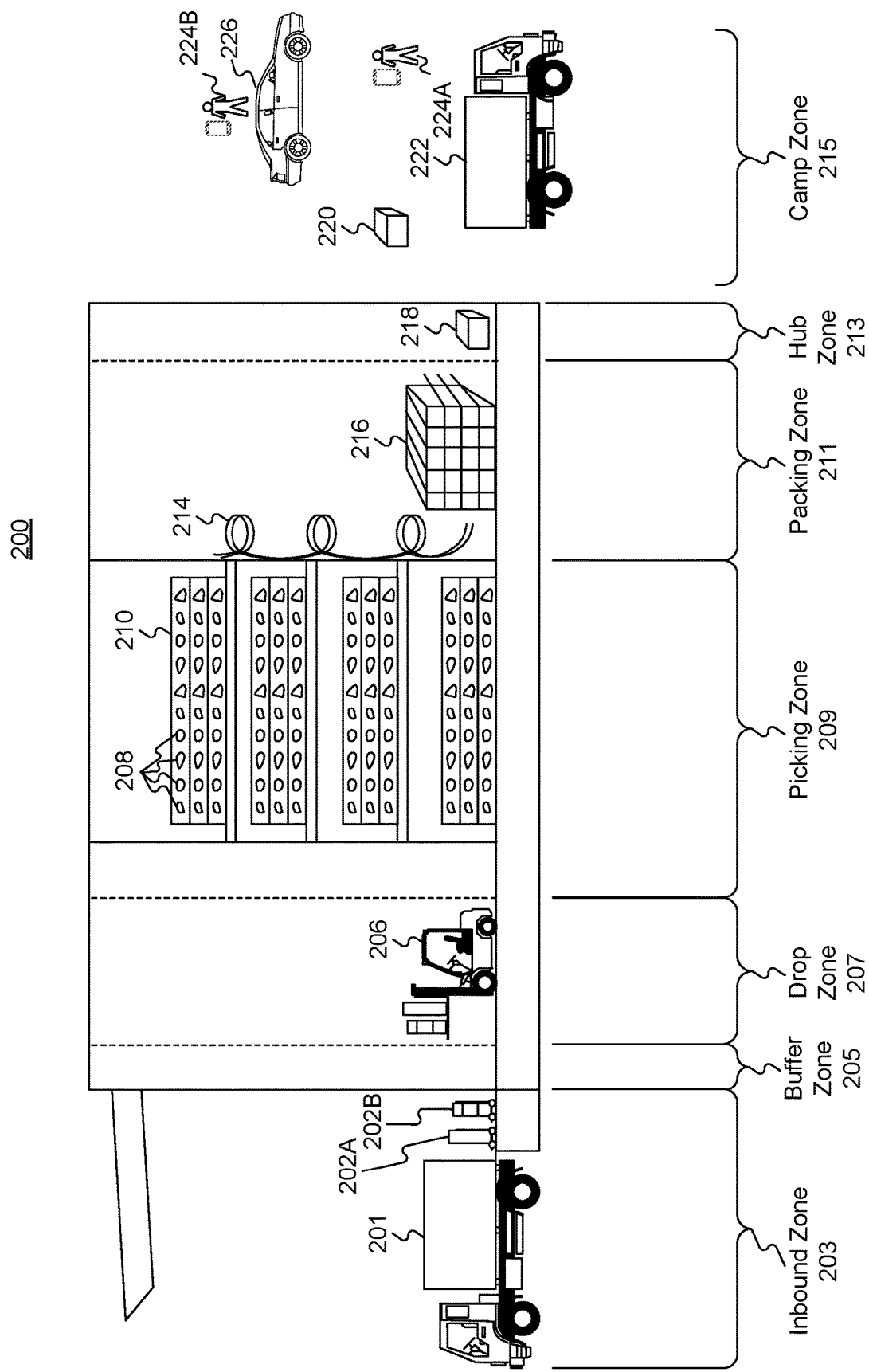
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119б.

Once a user places an order, a picker may receive an instruction on device 119б to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

According to some embodiments, system 100 may be hosted in a plurality of servers. Additionally, or alternatively, system 100 may be hosted on virtual or cloud server platforms. During the operation of system 100, information relating to the status of the various servers in system 100 may be generated, logged, and stored. The system status may indicate various aspects of the server systems including processor usage, memory usage, network usage, system errors, and other performance indicators of the server systems. From time to time, a user may desire to inquire a status information of a server at a particular time or time period, and may need to search for data related to the status information stored in one or more databases.

Figure 3:
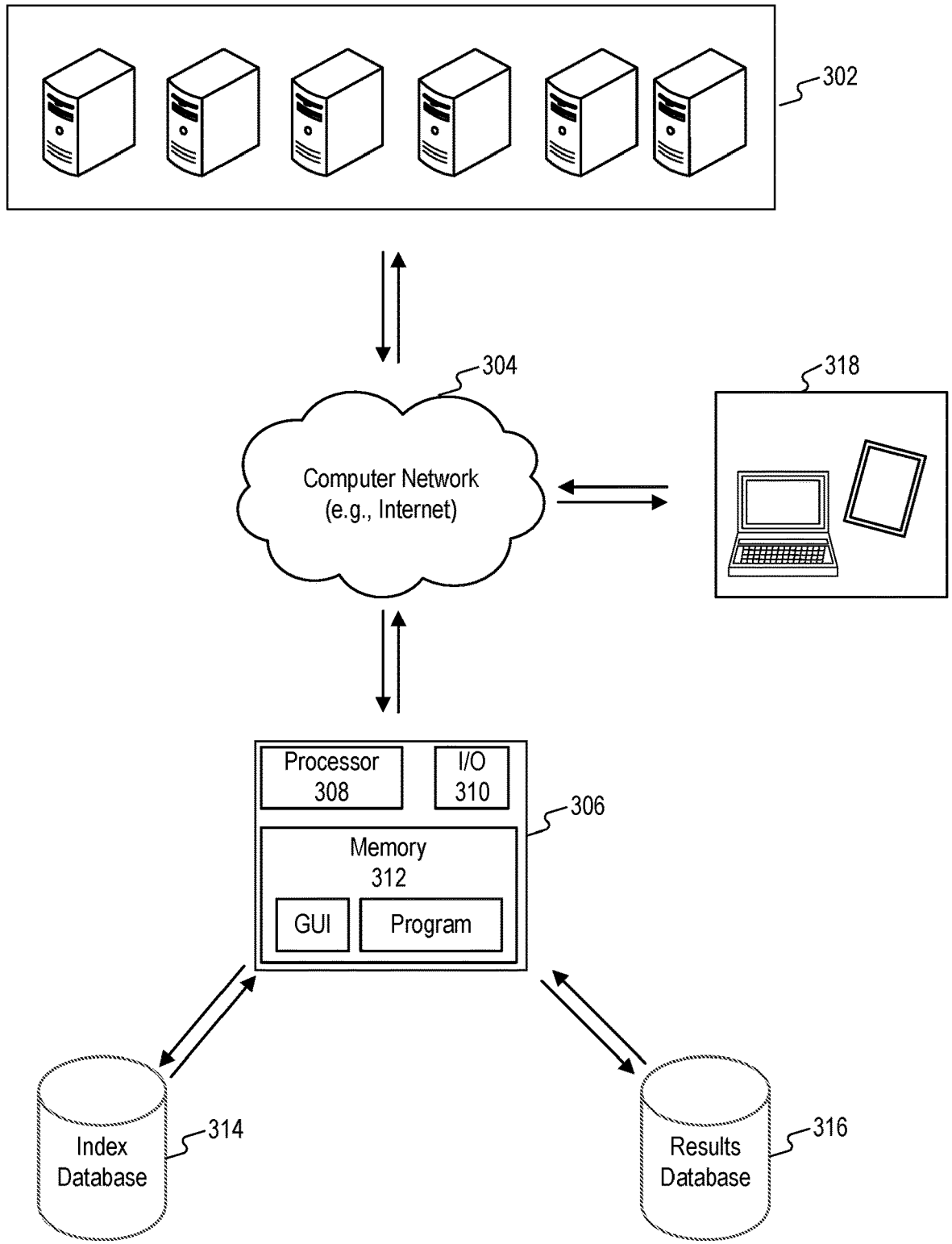
FIG. 3 depicts a schematic block diagram illustrating an exemplary system for reducing database query latency, consistent with the disclosed embodiments.

By way of example, FIG. 3 depicts an exemplary system for generating, indexing, storing, searching, and retrieving data related to system status. Server platforms 302 generate status data during operation. Server platforms 302 may be dedicated servers or virtual servers. In some embodiments, server platforms 302 may be examples of cluster computing systems. In some embodiments, certain subsystems of system 100, such as SAT system 101, transportation system 107, SOT system 111, FO system 113, SCM systems 117, . . . etc. may be hosted in one or more of the virtual servers that forms part of server platforms 302.

During operation, the status data are generated and recorded in the form of logs. Logs may be files containing data that can be processed by computer systems. In some embodiments, the data are transmitted to another location for storage. The data may be transmitted over network 304 to a different system, such as intermediate application 306, which in turn may process the data for storage in results database 316. In some embodiments, results database 316 may be a non-relational database or a NoSQL database. In some embodiments, intermediate application 306 may also index the data and store the index in index database 314. In some embodiments, index database 314 may be compatible with an inverted index search. Intermediate application 306 may be a computer system including one or more of processor 308, I/O 310, and memory 312 containing machine-readable instruction for generating a graphic user interface (GUI), and for carrying out required functions. In some embodiments, internal front end system 105 as depicted in FIG. 1A may serve the function of intermediate application 306.

A user using user device 318 may access stored status data by retrieving and accessing data stored in results database 316. In some embodiments, the user may retrieve data by sending to intermediate application 306 a search query. Intermediate application 306 processes the search query and performs an inverted index search using stored index in index database 314, and then attempts to locate data corresponding to parameters of the search query. Data that are found to match the search query may be returned to user device 318 via network 304. In some embodiments, external front end system 103 as depicted in FIG. 1A may serve to receive search query from users devices 102A or 102B, and to provide retrieved data to the user devices 102A or 102B. Users devices 102A or 102B may be examples of user device 318.

According to some embodiments, results database 316 may be implemented as a distributed, non-relational database. In a such distributed, non-relational databases, data is automatically replicated to multiple nodes for increased fault-tolerance. In some embodiments, there may not be a single points of failure, or network bottlenecks. In some embodiments, every node in a node cluster may be identical. Examples of distributed, non-relational databases include the Cassandra database. In the exemplary system depicted in FIG. 3, distributed databases may cause the same status data to be stored in multiple nodes and locations simultaneous, ensuring redundancy. In some embodiments, the status data may need indexing before being stored in a database to allow for future search and retrieval. Because of the large volume of data, a forward indexing method may be used so that the status data can be indexed and stored in a time expedient manner.

During the search and retrieval process however, the redundancy provided by a distributed, non-relational database may cause system delays. Since multiple nodes may be identical, a search for a particular data may require the system to sieve though multiple nodes to differentiate data that may appear similar. Moreover, while forward indexing may reduce processing time during the storing of data, it may be time consuming when the stored data is being searched. Combination of these factors may lead to latency when the system is tasked with finding and retrieving a specific piece of stored data.

In some embodiments, this delay may be reduced by employing inverted index search. Inverted index search is a form of full text index search. Examples of an inverted index search engine may include Elastic search. In some embodiments, intermediate application 306 may partially index the status data generated by server platforms 302 by an inverted indexing method, allowing the user to use inverted index search to retrieve the stored data with reduced latency.

Figure 4:
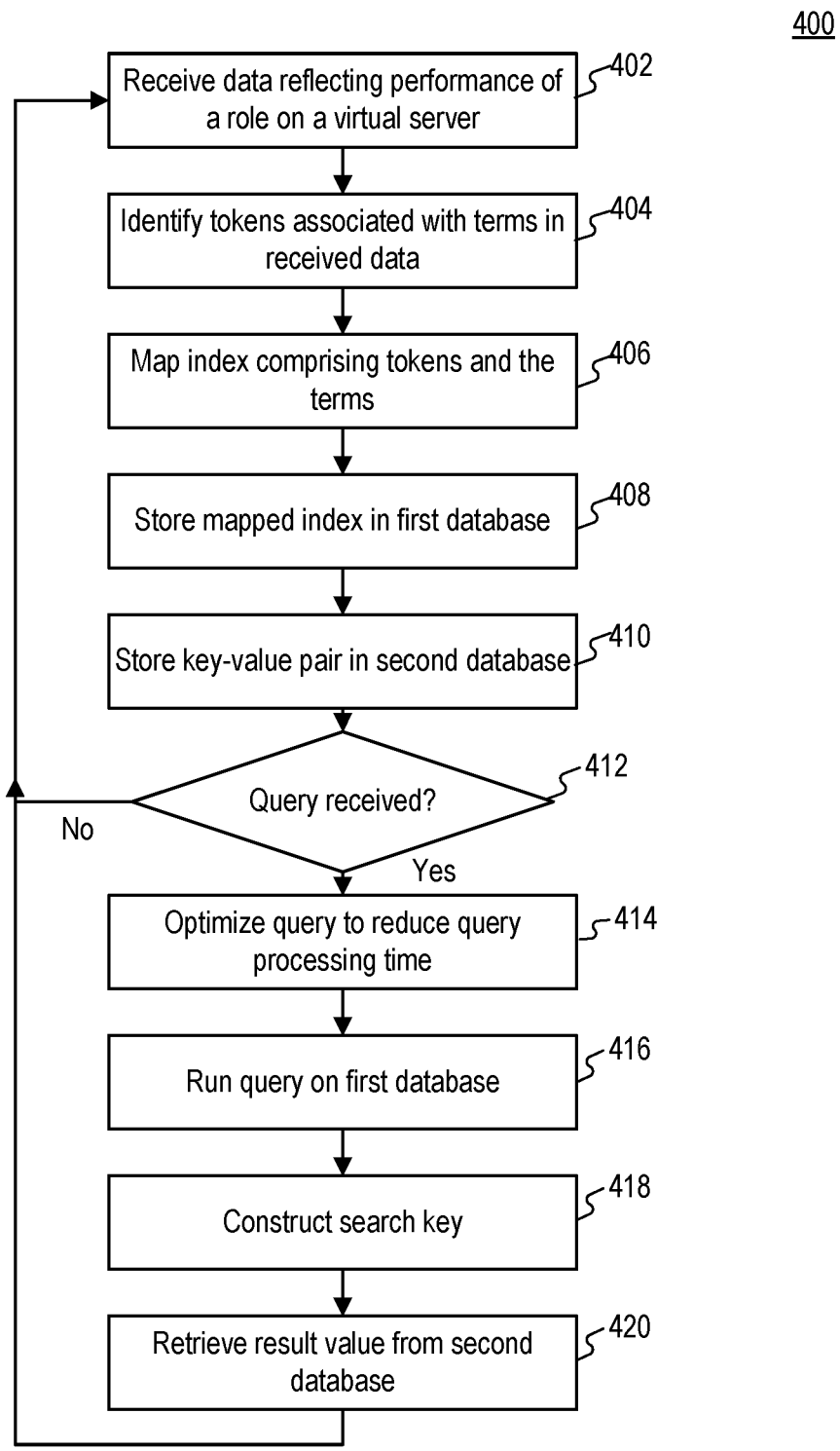
FIG. 4 depicts a flowchart illustrating an exemplary process for reducing database query latency, consistent with the disclosed embodiments.
Figure 5A:
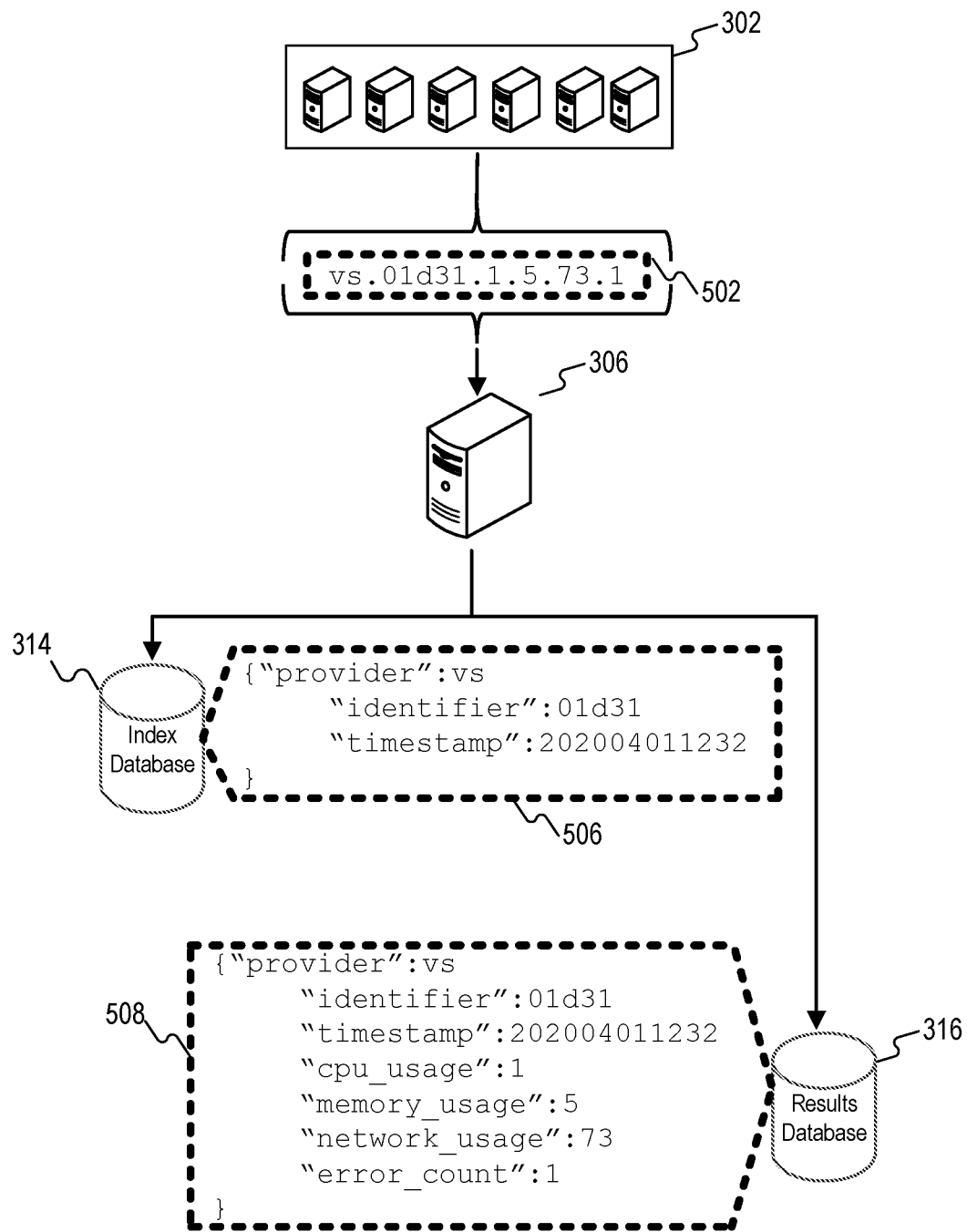
FIG. 5A depicts a block diagram illustrating an exemplary process for reducing database query latency, consistent with the disclosed embodiments.
Figure 5B:
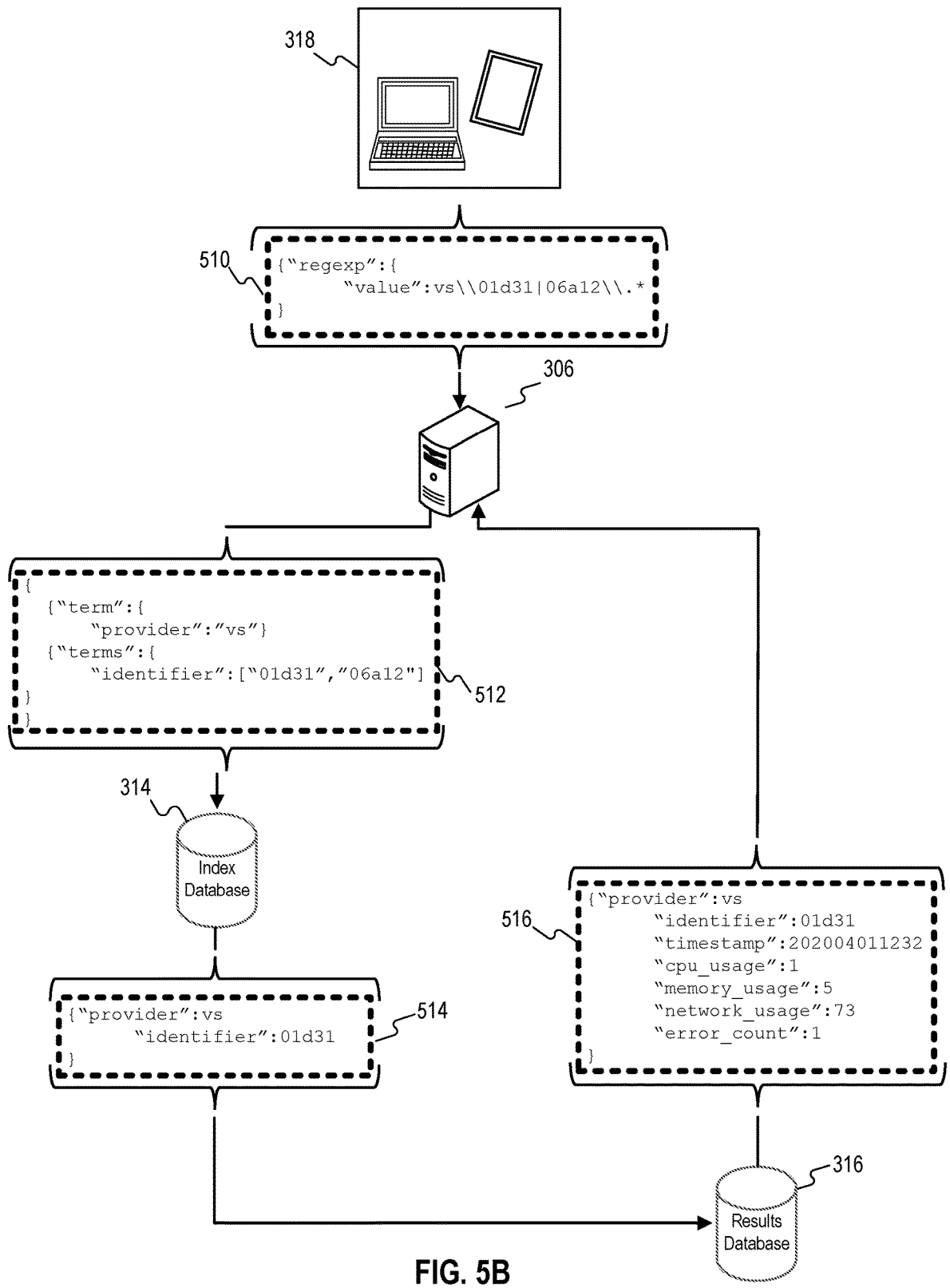
FIG. 5B depicts a block diagram illustrating an exemplary process for reducing database query latency, consistent with the disclosed embodiments.

FIG. 4 depicts a flow chart of an exemplary process for processing, indexing, searching, and retrieving of data values of system 300. FIG. 5A and FIG. 5B illustrate examples of certain steps of process 400. Steps 402-410 correspond to portions of process 400 for processing and indexing of the data values as depicted in FIG. 5A (described below). Steps 412-420 correspond to searching and retrieving of data values as depicted in FIG. 5B (described below).

In step 402, intermediate application 306 may receive data reflecting performance of a role on a server. A role may refer to a function or task carried out by the server. For example, a role may include web site hosting, simulation, processing, calculation, data storage, or other similar computer related functions that the server may be tasked to carried out. The server may be a dedicated server, a cloud server, or a virtual server. In some embodiments, the virtual server may be one of a plurality of virtual servers forming server platforms 302. The performance of a role may include metrics such as processor usage, memory usage, network usage, system errors, and other performance indicators of server systems 302. In some embodiments, the data may be contained in a log file.

In step 404, intermediate application 306 may identify tokens associated with terms in the received data. In some embodiments, identifying the tokens associated with the terms in the received data may include processing the received data with a regular expression. Regular expression, or regex, may be a string of characters defining a search. For example, the received data may be parsed into different string components. By way of example as illustrated in FIG. 5A, log 502 contains data string "vs.01d31.1.5.731.1", and are parsed into components of "vs", "01d31", "1", "5", "731", and "1". In some embodiments, intermediate application 306 may be programmed to recognize terms among the parsed components of the regular expression form. Terms may refer to information in a search index. For example, if data is to be index based on the identity of the server generating the data, the term may be the server identifier. In some embodiments, terms may include a provider, virtual server identifier, resource identifier, and/or metric identifier. By way of example as illustrated in FIG. 5A, system 300 may be configured to index log 502 based on a "provider" or a "identifier". In some embodiments, system 300 may include multiple clusters of server platforms 302. "Provider" may refer to information associated with one of the cluster of server platforms 302 that generated log 502. "Identifier" may refer to information associated with the virtual server within server platforms 302 that generated log 502. One of ordinary skilled in the art will recognize that terms may depend on design choices of the indexing scheme, and so that different indexing schemes may require different terms.

Token may refer to components of the received data corresponding to the terms. For example, as illustrated in FIG. 5A, term "provider" corresponds to token "vs", and term "identifier" corresponds to token "01d31". In some embodiments, intermediate application 306 may recognize the components of the received data as being tokens based on some predetermined rules.

In step 406, intermediate application 306 may map an index comprising tokens and the terms. By way of example, as illustrated in FIG. 5A, intermediate application 306 may be configured to recognize that the first component in log 502 is the token corresponding to "provider", that the second component in log 502 is the token corresponding to "identifier", and/or some other specific orderings of log 502 that may indicate components of log 502 are tokens corresponding to certain terms. In some embodiments, tokens of one term may be formatted differently from tokens of a different term, or other non-tokens. This may allow intermediate application 306 to identify tokens and corresponding terms among components of log 502. In some embodiments, the mapping may constitute a separate piece of data for storage, such as mapped index 506 illustrated in FIG. 5A.

In some embodiments, the received data may contain an appended time reflecting when the data were transmitted. For example, when log 502 data is sent to intermediate application 306, server platform 302 may append a time stamp to the data indicating the time of transmission. In some embodiments, system 300 may be further configured to index information based on time. By way of example, as illustrated in FIG. 5A, intermediate application 306 processes mapped index data 506 to further recognize the term "timestamp", corresponding to a time "202004011232."

In step 408, intermediate application 306 may store the mapped index in a first database. By way of example, as illustrated in FIG. 5A, mapped index 506 may be stored in index database 314.

In step 410, intermediate application 306 may store a key-value pair in a second database. In some embodiments, the key corresponds to the mapped index, and the value corresponding to a portion of the received data. Values may refer to various aspects of the performance of server platforms 302, such as CPU usage, memory usage, cost, network usage, error count, or operation count. In some embodiments, intermediate application 306 associates one or more components of the received data to the values based on some predetermined rules. By way of example, as illustrated in FIG. 5A, key-value pair 508 may include keys and values. Keys may include information that is included in mapped index 506, such as "provider", "identifier", and "timestamp". Values may include "cpu_usage", "memory_usage", "network_usage" and/or "error_count". Information associated with the values may be the non-token portion of log 502, such as "1", "5", "73", and "1". Intermediate application 306 may store key-value pair 508 in results database 316. As previously described, results database may be a non-relational database.

According to some embodiments, a user may attempt to retrieve information relating to the servers. The information sought by the user may be stored in the second database, such information may have been previously stored through process 400. The user may transmit a request for information through a search operation to intermediate application 306, which may process the request and perform the search operation. In some embodiments, the request may be in form of a query, which may be formatted according to some predetermined rules. For example, the query may be a regular expression.

In step 412, intermediate application 306 may receive a query. In some embodiments, if no query is received, process 400 returns to step 402 to continue to index and store data received from server platforms 302. By way of example as illustrated in FIG. 5B, intermediate application 306 may receive query 510 from user device 318. In some embodiments, query 510 may be a regrex expression. In the illustrated exampled of FIG. 5B, query 510 include expression ""value":vs\\01d31l06a12\\". In some embodiments, intermediate application 306 may be an application program interface (API).

In step 414, intermediate application 306 may optimize the query to reduce query processing time. In some embodiments, intermediate application 306 may extract information from query 510 so that an alternate expression may be generated. Searching through the database directly using query 510 in a regular expression may be problematic. Since regular expressions may be any search string, if the string was not worded carefully, it may encompass a wide range of information that the system may be forced to comb through. Hence, regular expressions may be undesirable because it is easy to accidentally create an innocuous expression looking for data that may require an immense amount of internal computing power to execute. Instead, intermediate application 306 optimize the query by reforming query 510 into an alternate expression compatible with a first database to perform an index search. In some embodiments, the index search is may be an inverted index search, and the index database may be inverted index search database. The alternate expression may be a term query. In some embodiments, the term query may include terms and tokens arranged in a JSON file structure.

In some embodiments, optimizing the query may include replacing a regular expression having no special characters with a term query. Alternatively or additionally, optimizing the query may include replacing a regular expression having an "OR" operator with a terms query. Alternatively or additionally, optimizing the query may include removing query elements that do not reduce query results.

By way of example as illustrated in FIG. 5B, intermediate application 306 parse query 510 from its regular expression to extract "value", "vs", "01d31", and "06a12." Based on this example regular expression, intermediate application 306 generates inverted index search query 512. As depicted in FIG. 5B, inverted index search query 512 may be a term query, where the terms are "provider" and "identifier", and the corresponding tokens are "vs", and "01 d31" and "06a12." Inverted index search query 512 may also be an example of a term query where and "OR" operator is replaced, as inverted index search query 512 will return results for "identifier" having values of "01d31", "06a12", or both.

In step 416, intermediate application 306 runs the optimized query on the first database. As illustrated in FIG. 5B, intermediate application 306 performs an inverted index search using inverted index search query 512 in index data base 314. In some instances, the inverted index search returns matches, while in some other instances, no match is returned. In the illustrated example, index database 314 does not contain "identifier" with value of "06a12", but does contain "identifier" with values "01d31." Based on this result, intermediate application 306 eliminate "06a12".

In step 418, intermediate application 306 may construct a search key based on results obtained by running the optimized query against the first database. In some embodiments, the search key may be another search string different from the query received by intermediate application 306 from the user. In some embodiments, the search key may be the key of the key-value pair generated in step 410. By way of example as illustrated in FIG. 5B, intermediate application 306 constructs search key 514 based on the results of search in step 414.

In step 420, intermediate application 306 may retrieve result value from the second database. In some embodiments, the result value may correspond to the value of the key-value pair generated in step 410. The result value may be returned to the user for display or viewing. By way of example as illustrated in FIG. 5B, intermediate application 306 runs query using search key 514 in results database 316. Once result value 516 is found, intermediate application 306 returns it to the user via user device 318.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for reducing database query latency, the system comprising:
    a memory storing instructions; and
    at least one processor configured to execute the instructions to perform operations comprising:
        storing a key-value pair in a first database, the key corresponding to a mapped index, and the value corresponding to data reflecting performance of a role on a virtual server;
        receiving a query from a user, wherein the query includes an expression value;
        optimizing the query to reduce query processing time by extracting information from the query to generate an alternate expression, wherein the alternate expression is compatible with a second database to perform the index search;
        running the optimized query against the mapped index, wherein the optimized query includes terms and tokens arranged in a first file format;
        constructing a search key based on results obtained by running the optimized query against the mapped index, wherein the search key corresponds to the key of the key-value pair; and
        retrieving data corresponding to the search key by running the search key against the database, wherein the data corresponds to the value of the key-value pair.

2. The system of claim 1, wherein optimizing the query to reduce query processing time comprises:
    replacing a regular expression having no special characters with a term query,
    replacing a regular expression having an "OR" operator with a terms query, or
    removing query elements that do not reduce query results.

3. The system of claim 1, wherein the first database is a non-relational database.

4. The system of claim 1, wherein the mapped index includes terms including at least one of a provider, virtual server identifier, resource identifier, or metric identifier.

5. The system of claim 4, wherein the data reflecting the performance of the role on the virtual server further comprises an appended time reflecting when the data reflecting the performance of the role were transmitted, and the terms further comprise a timestamp.

6. The system of claim 1, wherein the at least one processor is further configured to identify tokens associated with terms by processing the data reflecting the performance of the role on the virtual server with a regular expression.

7. The system of claim 1, wherein the value of the key-value pair includes at least one of CPU usage, memory usage, cost, network usage, error count, or operation count.

8. The system of claim 1, wherein the first file structure is a JSON file structure.

9. The system of claim 1, wherein running the optimized query against the mapped index includes transferring the optimized query using an API.

10. A computer-implemented method for reducing database query latency, the method comprising:
    storing a key-value pair in a first database, the key corresponding to a mapped index, and the value corresponding to data reflecting performance of a role on a virtual server;
    receiving a query from a user, wherein the query includes an expression value;
    optimizing the query to reduce query processing time by extracting information from the query to generate an alternate expression, wherein the alternate expression is compatible with a second database to perform the index search;
    running the optimized query against the mapped index, wherein the optimized query includes terms and tokens arranged in a first file format;
    constructing a search key based on results obtained by running the optimized query against the mapped index, wherein the search key corresponds to the key of the key-value pair; and
    retrieving data corresponding to the search key by running the search key against the database, wherein the data corresponds to the value of the key-value pair.

11. The method of claim 10, wherein optimizing the query to reduce query processing time comprises:
    replacing a regular expression having no special characters with a term query,
    replacing a regular expression having an "OR" operator with a terms query, or
    removing query elements that do not reduce query results.

12. The method of claim 10, wherein the first database is a non-relational database.

13. The method of claim 10, wherein the mapped index includes terms including at least one of a provider, virtual server identifier, resource identifier, and metric identifier.

14. The method of claim 13, wherein the data reflecting the performance of the role on the virtual server further comprises an appended time reflecting when the data reflecting the performance of the role were transmitted, and the terms further comprise a timestamp.

15. The method of claim 10, further comprising identifying tokens associated with terms by processing the data reflecting the performance of the role on the virtual server with a regular expression.

16. The method of claim 10, wherein the value of the key-value pair includes at least one of CPU usage, memory usage, cost, network usage, error count, or operation count.

17. The method of claim 10, wherein the first file structure is a JSON file structure.

18. The method of claim 10, wherein running the optimized query against the mapped index includes transferring the optimized query using an API.

* * * * *